US006977125B2

United States Patent
Oogaku et al.

(10) Patent No.: US 6,977,125 B2
(45) Date of Patent: Dec. 20, 2005

(54) CLOSED TYPE BATTERY

(75) Inventors: Tetsuhiro Oogaku, Utsunomiya (JP); Eiji Hara, Utsunomiya (JP)

(73) Assignee: NEC Tokin Tochigi, Ltd., Tochigi (JP)

( * ) Notice: Subject to any disclaimer, the term of this patent is extended or adjusted under 35 U.S.C. 154(b) by 386 days.

(21) Appl. No.: 10/292,435

(22) Filed: Nov. 13, 2002

(65) Prior Publication Data
US 2003/0091897 A1   May 15, 2003

(30) Foreign Application Priority Data
Nov. 14, 2001   (JP) .............................. 2001-348578

(51) Int. Cl.[7] .......................... H01M 2/06; H01M 2/08
(52) U.S. Cl. ..................................... 429/180; 429/184
(58) Field of Search ............................ 429/180, 181, 429/182, 184

(56) References Cited

U.S. PATENT DOCUMENTS

| 6,296,967 B1 * | 10/2001 | Jacobs et al. ........... 429/181 X |
| 6,509,115 B2 * | 1/2003 | Kim et al. .............. 429/180 X |
| 6,673,489 B2 * | 1/2004 | Fong et al. ................ 429/181 |
| 6,835,494 B2 * | 12/2004 | Hayashi et al. ............. 429/180 |
| 2002/0009634 A1 * | 1/2002 | Oogaku ..................... 429/180 |
| 2003/0077511 A1 * | 4/2003 | Mizuno et al. ............. 429/181 |
| 2003/0134193 A1 * | 7/2003 | Hanafusa et al. .......... 429/181 |

FOREIGN PATENT DOCUMENTS

GB   2111295   *   6/1983   ........... H01M 2/06

* cited by examiner

Primary Examiner—Stephen J. Kalafut
(74) Attorney, Agent, or Firm—Westerman, Hattori, Daniels & Adrian, LLP

(57) ABSTRACT

The present invention provides a closed type battery that is free from any sealing defects due to a sag of caulking with time, etc. The closed type battery is constructed of a monolithic electrode terminal that comprises an insulating member for covering the inner surface of a through-hole formed through a metal sheet for sealing up an opening of a battery can and both surfaces of the metal sheet around the through-hole, and an electrode-drawing sheet having a synthetic resin layer formed on one surface thereof, which sheet is located on the surface of the insulating member positioned on the outer surface of the battery while the synthetic resin layer comes in contact therewith, wherein the electrode-drawing sheet and the insulating member are integrated together by means of an electrode-leading pin passed through a through-hole in the electrode-drawing sheet.

4 Claims, 3 Drawing Sheets

CLOSED TYPE BATTERY

BACKGROUND OF THE INVENTION

The present invention relates generally to a closed type battery, and more particularly to a closed type battery comprising a battery can and an electrode-drawing sheet that becomes an electrode terminal, to which a battery terminal of polarity opposite to that of the battery can is attached via an insulating member.

Various batteries are used as power sources for electronic equipments of miniature size, and miniature yet large-capacity closed batteries are employed as power sources for cellular phones, notebook PCs, camcorders, etc. Typically, closed batteries using a non-aqueous electrolyte such as lithium batteries and lithium ion rechargeable batteries are now used.

To keep pace with the downsizing of equipments, closed batteries of rectangular shape capable of making effective use of a small space, to say nothing of cylindrical batteries, are enjoying wide applications. In a typical rectangular battery, a battery can working as one electrode of the battery is provided with an electrode terminal while isolated therefrom by an insulating member.

One such typical example of the closed type battery of rectangular shape is shown in FIG. 2.

A closed type battery shown generally at 1 comprises a cylindrical form of rectangular metal package 2 (hereinafter often called the battery can) made of stainless steel, soft steel nickeled on its surface, etc., in which there is a battery element comprising a roll form of cathode and anode stacked one upon another via a separator. At the upper end of the battery can 2, there is a header 7 formed by integrating an external insulating sheet 4A and a cathode-side electrode drawing sheet 5 with a metal sheet 3 by means of a cathode-side electrode leading pin 6; this header 7 is mounted and sealed at the opening of the battery can 2. One portion of the header 7 is made thinner (shown at 8) than the rest thereof so as to let an abnormally rising internal pressure escape from the battery and another portion of the header 7 is provided with a hole 9 from which an electrolyte is poured in the battery assembly and which is sealed up after the pouring of the electrolyte. After the electrolyte is poured from the hole 9 into the battery assembly, a metal member such as a stainless steel member is embedded in the hole 9, and then welded thereto for sealing purposes.

One exemplary header is shown in FIGS. 3(A) and 3(B). FIG. 3(A) is illustrative in perspective of the header, and FIG. 3(B) is illustrative in section of the header in which a cathode-leading pin is ready for caulking.

An internal insulating sheet 4B formed of a polypropylene, fluorocarbon resin, etc. is mounted on a metal sheet 3 formed of a stainless steel sheet, a nickeled soft steel sheet, etc. by inserting a projection on the sheet 4B into a through-hole 10 formed in the sheet 3 from below. Then, an external insulating sheet 4A is placed over the upper surface of the sheet 3 to form an insulating member. Then, an electrode-leading pin 6 formed of a metal of good conductivity such as aluminum or an aluminum alloy and having a collar 6A is inserted through a hollow portion of the projection on the internal insulating sheet 4B, and an electrode-drawing sheet 5 is fitted in the external insulating sheet 4A. Finally, the collar 6A and the tip of a shaft 6B of the electrode-leading pin are caulked from above and below to form a header 7.

After joined to the collar 6A of the electrode-leading pin 6 of the thus prepared header 7, an electrically conductive tab 12 joined to the battery element and covered with an insulating member 11 is fitted into an opening of the battery can, and then laser welded at its periphery to seal up the opening.

Upon header assembling, the electrode-leading pin 6 is crushed by caulking into contact with the plane of the electrode-drawing sheet 5, so that a conductive connection is made between the electrode-leading pin and the cathode-drawing sheet 5. On the other hand, the lower surface of the electrode-drawing sheet 5 comes in contact with the surface of the external insulating sheet 4A for hermetic or airtight purposes.

Since the tab for the connection of the battery to an external circuit is soldered, welded or otherwise joined to the electrode-drawing sheet, however, it is likely that there will be a drop of hermeticity due to shrinkage by thermal hysteresis upon joining of the synthetic resin of the external insulating sheet or a sag of caulking.

A primary object of the present invention is to provide a closed type battery having an electrode-sealing structure sealed by caulking of an electrode-leading pin, which is improved in terms of insulation, hermecity and airtightness between an insulating sheet and an electrode-drawing sheet, and shows reduced changes with time and increased reliability.

SUMMARY OF THE INVENTION

According to the present invention, the aforesaid object is achieved by the provision of a closed type battery including a monolithic electrode terminal that comprises an insulating member for covering an inner surface of a through-hole formed through a metal sheet for sealing up an opening of a battery can and both surfaces of said metal sheet around said through-hole, and an electrode-drawing sheet having a synthetic resin layer formed on one surface thereof, which sheet is located on a surface of said insulating member positioned on an outer surface of said battery while said synthetic resin layer comes in contact therewith, wherein said insulating member and said electrode-drawing sheet are integrated together by means of an electrode-leading pin passed through a through-hole in said electrode-drawing sheet.

In the closed type battery of the present invention, the synthetic resin layer formed on the electrode-drawing sheet is an epoxy resin layer.

The closed type battery of the present invention is provided in the form of a lithium ion battery.

DESCRIPTION OF THE PREFERRED EMBODIMENT

In the closed type battery of the present invention, the electrode-drawing sheet and insulating member are integrated together by caulking of the electrode-leading pin from below and above. According to the present invention, it has now been found that by using as the electrode-drawing sheet a member having a synthetic resin layer formed on its one surface, it is possible to prevent the occurrence of phenomena wherein, when an external connecting circuit is soldered, welded or otherwise thermally connected to the electrode-drawing sheet of an electrode-drawing terminal, the insulating member becomes poor in hermeticity with time and increases in electrical resistance.

The closed type battery of the present invention is now explained with reference to FIGS. 1(A) and 1(B).

Figure 1:
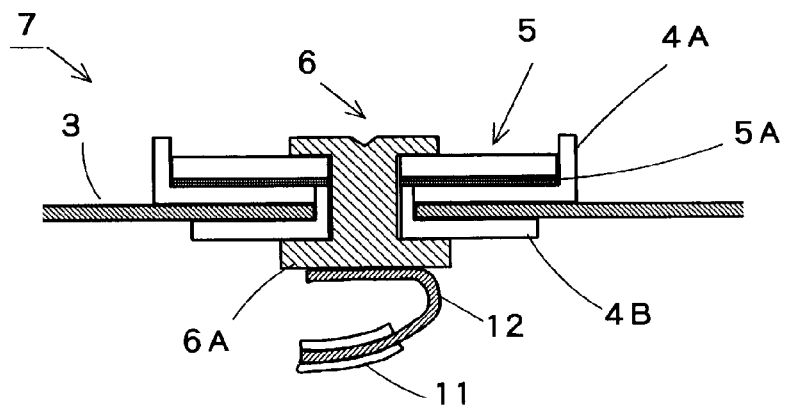
FIGS. 1(A) and 1(B) are illustrative of a closed type battery according to the present invention.
Figure 1:
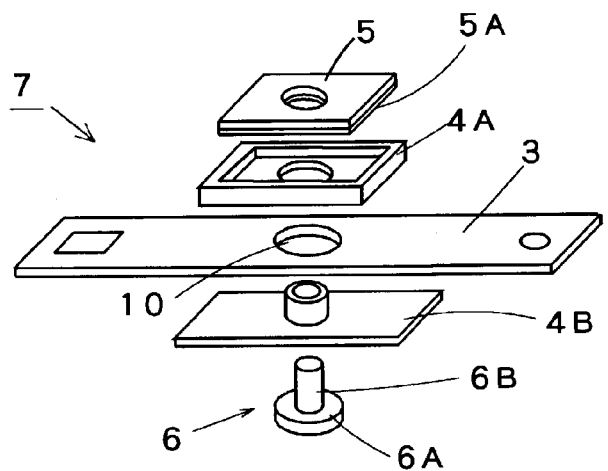
Figure 2:
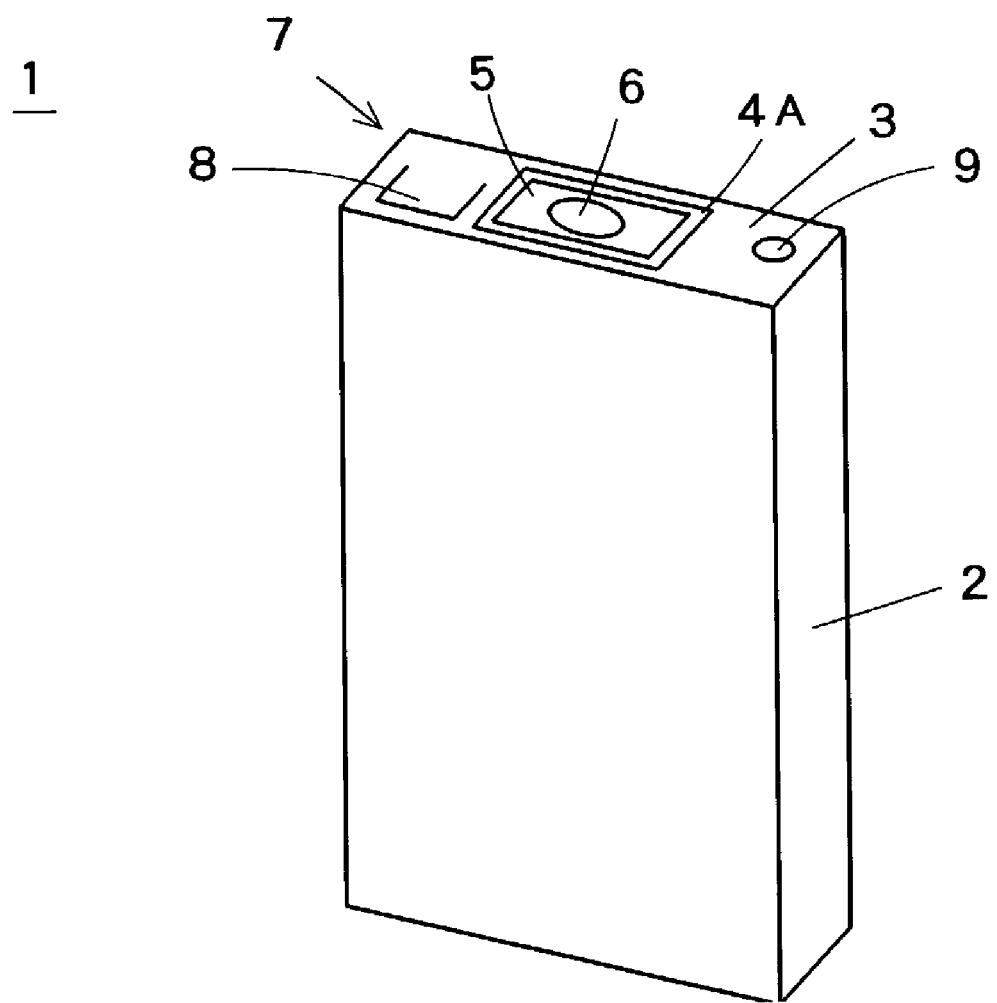
FIG. 2 is illustrative of one exemplary closed type of rectangular battery.
Figure 3:
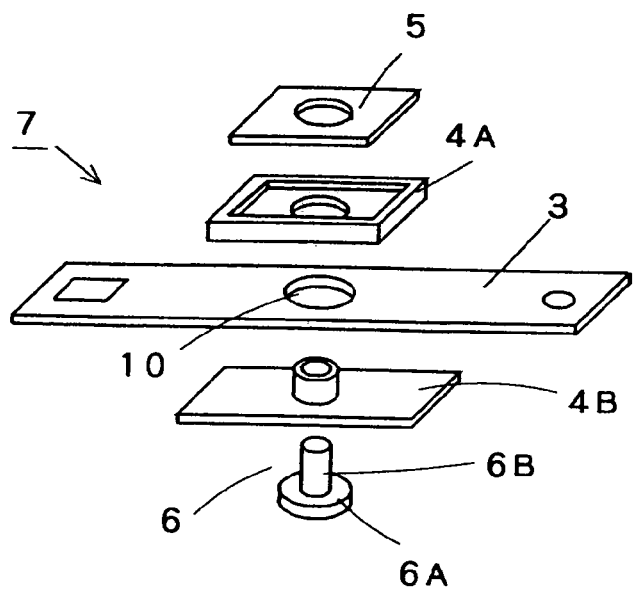
FIGS. 3(A) and 3(B) are illustrative of one exemplary header.
Figure 3:
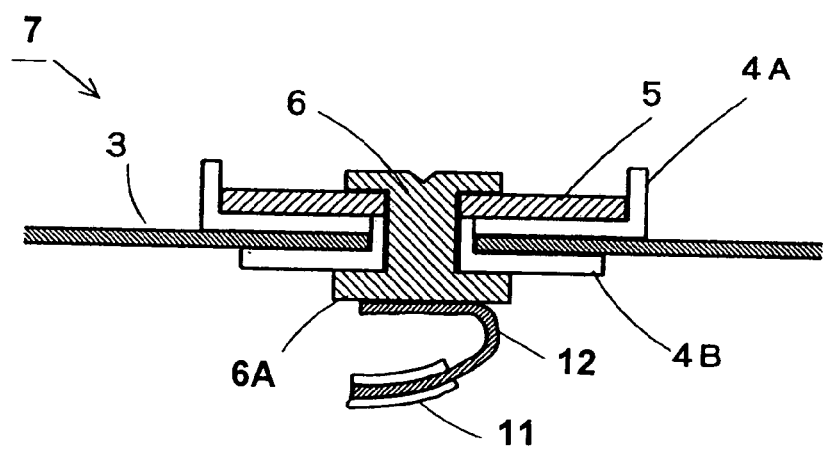

FIG. 1(A) is illustrative in section of a substantial portion of the electrode-drawing terminal of the closed type battery, and FIG. 1(B) is illustrative in perspective of each component of a header 7 prior to its assembling.

As shown in FIG. 1(A), a metal sheet 3 of a header 7 that forms a part of the closed type battery is provided with an external insulating sheet 4A and an internal insulating sheet 4B in such a way as to cover the internal surface of a through-hole 10 formed through the metal sheet 3 and the upper and lower surface portions of the metal sheet 3 around the through-hole 10. The external insulating sheet 4A is provided thereon with an electrode-drawing sheet 5.

The electrode-drawing sheet 5 is formed on one surface with a synthetic resin layer 5A that comes into contact with the upper surface of the external insulating sheet 4A. An electrode-leading pin 6 is passed through the assembly from the side of the internal insulating sheet 4B and caulked at its top to seal up the through-hole so that the assembly is provided in a monolithic form.

An electrically conductive tab 12 that is protected by an insulating member 11 joined to a battery electrode of a battery element is joined to a collar 6A of the electrode-leading pin 6 to make an electrically conductive connection to the battery element.

The internal insulating sheet 4B of the header positioned inside the battery and at the inner wall of the through-hole may be inserted through and attached to the through-hole formed through the metal sheet 3, as depicted in FIG. 1(B). Alternatively, the sheet 4B may be integrated with the metal sheet as by the insert molding of a metal sheet and an insulating material.

When the insulating member is integrated with a lid member that forms the header by insert molding or other means, it is possible to make the insulating member thinner than when it is formed of a plurality of pieces, and so make header size small. It is further possible to reduce the number of header assembly steps.

The insulating material used, for instance, includes polypropylene or thermoplastic fluorocarbon resins such as tetrafluoroethylene-perfluoroalkoxyethylene copolymers (PFA) and tetrafluoroethylene-hexafluoropropylene copolymers (FEP).

For the electrode-drawing sheet provided on the upper surface of the external insulating sheet 4A positioned on the outer surface of the header, use may be made of a nickel sheet, a nickeled soft steel sheet, a copper sheet, a nickel silver sheet or the like.

For the synthetic resin layer formed on the electrode-drawing sheet, it is preferable to use resin layers of good heat resistance and good adhesion to metal materials such as an epoxy resin layer, a polyurethane resin layer and polyvinyl chloride resin layer, among which the epoxy resin layer is preferred in view of solvent resistance. Although applicable by various methods, these synthetic resin layers should preferably be formed by coating.

The synthetic resin layer should preferably have a thickness of 5 $\mu$m to 30 $\mu$m. Especially when the synthetic resin layer is formed by coating, coating thickness variations are observed at a thickness that is thinner than 5 $\mu$m, whereas coating becomes difficult at a thickness that is thicker than 30 $\mu$m.

The electrode-drawing sheet may be prepared by coating a curable composition on a sheet-like member such as a nickel sheet, a nickeled soft steel sheet, a copper sheet or a nickel silver sheet to uniform thickness, then curing that composition, then cutting that member into desired shape, and finally providing therein a hole for the electrode-leading pin, etc.

For the electrode-leading pin, it is preferable to use a pin member obtained by configuring a metal material of aluminum or its alloy into an electrode-leading pin blank, followed by annealing.

Annealing allows the electrode-leading pin to be uniformly transformed upon caulking, and to have so decreased surface hardness that surface cracking or other defects are unlikely to occur. This in turn makes improvements in hermeticity, etc. between the electrode-leading pin and the insulating member.

It is here noted that annealing causes a temporary lowering of the hardness of the electrode-leading pin; however, the electrode-leading pin that has been caulked has a hardness equivalent to that of one not annealed because of being subjected to work-hardening by impacts on caulking. Thus, the sealing properties are unlikely to become low, nor is the caulking strength of the electrode-leading pin likely to drop.

The present invention is now explained with reference to Example 1 and Comparative Example 1.

EXAMPLE 1

An external insulating sheet and an internal insulating sheet were attached to a through-hole of 2.6 mm in diameter, which was provided through the center of a rectangular, nickeled soft steel sheet having a long side of 33 mm and a short side of 5 mm. On the external insulating sheet there was then placed an electrode-drawing sheet 5 formed of a nickel sheet member and having a 7-$\mu$m thick epoxy resin layer formed on one surface thereof. Then, an aluminum electrode-leading pin in a cylindrical form of 1.5 mm in diameter was inserted through the assembly from the internal insulating sheet. Finally, the electrode-leading pin was caulked from below and above to prepare a header.

The header was welded to a 48-mm high, 29-mm wide, 6-mm thick nickeled soft steel battery can with a battery element of a lithium ion battery received therein. Then, an electrolyte was poured in the battery can through an electrolyte-pouring hole. Finally, the pouring hole was sealed up to prepare a closed type battery.

The thus prepared 100 batteries were measured in terms of whether or not there was electrolyte leakage from the electrode-leading terminals after the lapse of 500 hours. All the batteries were found to be free from electrolyte leakage.

COMPARATIVE EXAMPLE 1

Using a battery header assembled as in Example 1 with the exception that no epoxy resin layer was formed on the electrode-drawing sheet, a closed type battery was prepared. The thus prepared 100 batteries were measured in terms of whether or not there was electrolyte leakage from the electrode-leading terminals after the lapse of 500 hours. As a result, a 0.1% electrolyte leakage was found.

In the closed type battery of the invention as explained above, the external connection terminal prepared by the caulking of the electrode-leading pin for electrical connection to the electrode-drawing sheet is placed on the insulating member while the synthetic resin layer thereof is in contact with the insulating member. Accordingly, the adhesion between the insulating member and the electrode-drawing sheet is so improved that it is unlikely that electrolyte leakage will occur due to a sag-with-time of caulking which may otherwise be caused by thermal influences, etc. upon the joining of an electrically connecting tab.

What we claim is:

1. A closed type battery comprising a monolithic electrode terminal, which comprises an insulating member for covering an inner surface of a through-hole formed through a metal sheet for sealing up an opening of a battery can and both surfaces of said metal sheet around said through-hole, and an electrode-drawing sheet having a synthetic resin layer formed on one surface thereof, which electrode-drawing sheet is located on a surface of said insulating member positioned on an outer surface of said battery while said synthetic resin layer comes in contact therewith, wherein said electrode-drawing sheet and said insulating member are integrated together by means of an electrode-leading pin passed through a through-hole in said electrode-drawing sheet.

2. The closed type battery according to claim 1, wherein said synthetic resin layer formed on said electrode-drawing sheet is an epoxy resin layer.

3. The closed type battery according to claim 2, which is a lithium ion battery.

4. The closed type battery according to claim 1, which is a lithium ion battery.

* * * * *